US006788676B2

(12) United States Patent
Partanen et al.

(10) Patent No.: US 6,788,676 B2
(45) Date of Patent: Sep. 7, 2004

(54) USER EQUIPMENT DEVICE ENABLED FOR SIP SIGNALLING TO PROVIDE MULTIMEDIA SERVICES WITH QOS

(75) Inventors: Tinna Partanen, Tampere (FI); Jouni Rapakko, Kylmäakoski (FI); Markku Ojala, Tampere (FI); Vlad A. Stirbu, Tampere (FI)

(73) Assignee: Nokia Corporation, Espoo (FI)

( * ) Notice: Subject to any disclaimer, the term of this patent is extended or adjusted under 35 U.S.C. 154(b) by 56 days.

(21) Appl. No.: 10/285,341

(22) Filed: Oct. 30, 2002

(65) Prior Publication Data

US 2004/0085949 A1 May 6, 2004

(51) Int. Cl.[7] .............................................. H04L 12/64
(52) U.S. Cl. ...................................... 370/352; 370/354
(58) Field of Search ........................... 370/252, 352–356

(56) References Cited

U.S. PATENT DOCUMENTS

| 2002/0151312 | A1 | * | 10/2002 | Rosemarijin ................. 455/452 |
| 2003/0120135 | A1 | * | 6/2003 | Gopinathan et al. ......... 600/300 |
| 2003/0156578 | A1 | * | 8/2003 | Bergenlid et al. ............ 370/352 |
| 2003/0172160 | A9 | * | 9/2003 | Widegren et al. ............ 709/226 |

OTHER PUBLICATIONS

"UMTS Quality of Service (QoS)—An End–to–End View," published by Award Solutions, Inc., Richardson, Texas, Brad Stinson et al., Jul. 2001, pp. 1–7.
"Advanced SIP Series: SIP and 3GPP," published by Award Solutions, Inc., Richardson, Texas , Narayan Parameshwar et al., downloaded from the Internet before Oct. 30, 2002, pp. 1–9.
"Advanced SIP Series: Extending SIP," published by Award Solutions, Inc., Richardson, Texas, Gary Cote, downloaded from the Internet before Oct. 30, 2002, pp. 1–5.
"Advanced SIP Series: SIP and 3GPP," published by Award Solutions, Inc., Richardson, Texas, Narayan Parameshwar et al., downloaded from the Internet before Oct. 30, 2002, pp. 1–10.

"3rd Generation Partnership Project; Technical Specification Group Services and System Aspects; Service requirements for the Internet Protocol (IP) multimedia core network subsystem; Stage 1 (Release 6)," 3GPP TS 22.228, V6.1.0, published by 3GPP, Valbonne, France, Sep. 2002, pp. 1–16.

"3rd Generation Partnership Project; Technical Specification Group Services and System Aspects; IP Multimedia Subsystem (IMS); Stage 2 (Release 5)," 3GPP TS 22.228, V5.6.0, published by 3GPP, Valbonne, France, Sep. 2002, pp. 1–126.

(List continued on next page.)

Primary Examiner—Melvin Marcelo
(74) Attorney, Agent, or Firm—Ware, Fressola, Van Der Sluys & Adolphson LLP

(57) ABSTRACT

A user equipment (UE) device (11) including a mobile terminal (MT) (11b 11b') coupled to a terminal equipment (TE) device (11a) including an IP Multimedia Subsystem (IMS) proxy adjunct (P+) for use by the TE (11a) in making multimedia service requests for IP communications with a desired end-to-end QoS, the end-to-end including the local connection and a network supporting QoS, e.g. an UMTS network (12) having as an extension of its packet-switched core network (12b) an IMS (12c) providing multimedia services with selected QoS. The IMS proxy adjunct (P+) is implemented to make extensions to messages according to any protocol providing a session description protocol (SDP) component, such as SIP or RTSP, so as to ensure the selected QoS. In addition, a mechanism is provided by which the MT (11b') informs the IMS (12c) when it has IMS proxy capabilities.

14 Claims, 9 Drawing Sheets

OTHER PUBLICATIONS

"3$^{rd}$ Generation Partnership Project; Technical Specification Group Core Network; Singalling flows for the IP multimedia call control based on sIP and ADP; Stage 3 (Release 5)," 3GPP TS 24.228, V5.2.0, published by 3GPP, Valbonne, France, Sep. 2002, pp. 1–31.

"3$^{rd}$ Generation Partnership Project; Technical Specification Group Terminals; Characteristics of the ISIM Application (Release 5)," 3GPP TS 31.103, V5.1.0, published by 3GPP, Valbonne, France, Sep. 2002, pp. 1–16.

"3$^{rd}$ Generation Partnership Project; Technical Specification Group Services and System Aspects; 3G Security; Access security for IP–based services (Release 5)," 3GPP TS 33.203, V5.3.0, published by 3GPP, Valbonne, France, Sep. 2002, pp. 1–37.

"SDP: Session Description Protocol," published by Network Working Group, M. Handley et al., Apr. 1998, pp. 1–42.

"RFC 2528," published by Network Working Group, R. Housley et al., Mar. 1999, pp, 1–8.

"SIP: Session Initiation Protocol, " published by Network Working Group, H. Handley et al., Mar. 1999, pp. 1–153.

"SIP: Session Initiation Protocol, " published by Network Working Group, J. Rosenberg et al., Jun. 20029, pp. 1–269.

"Integration of Resource Management and Session Initiation Protocol (SIP)," published by Network Networking Group, G. Camarillo et al., Oct. 2002, pp. 1–30.

"S3–010342," 3GPP TSG SA WG3 Security—S3#19, published by 3GPP, Newbury, UK, Jul. 3–6, 2001, pp. 1–5.

"Tdoc TP–010286," 3GPP TSG-T (Terminals) Meeting #14, published by 3GPP, Kyoto, Japan, Dec. 12–14, 2001, pp. 1.

"IP Mobility Support," published by Network Working Group, C. Perkins, Oct. 1996, pp. 1–79.

* cited by examiner

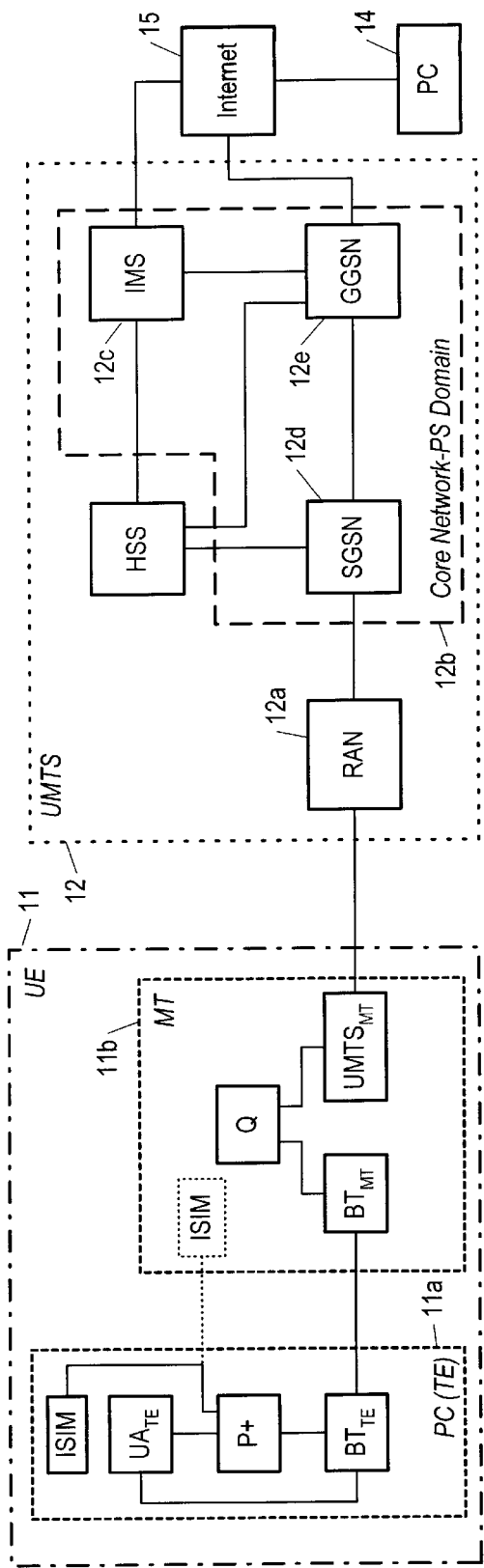
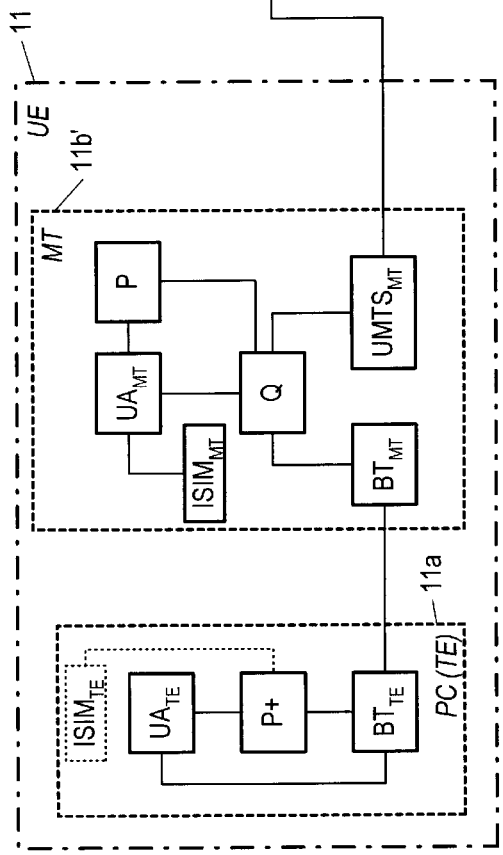
FIG. 1A
FIG. 1B

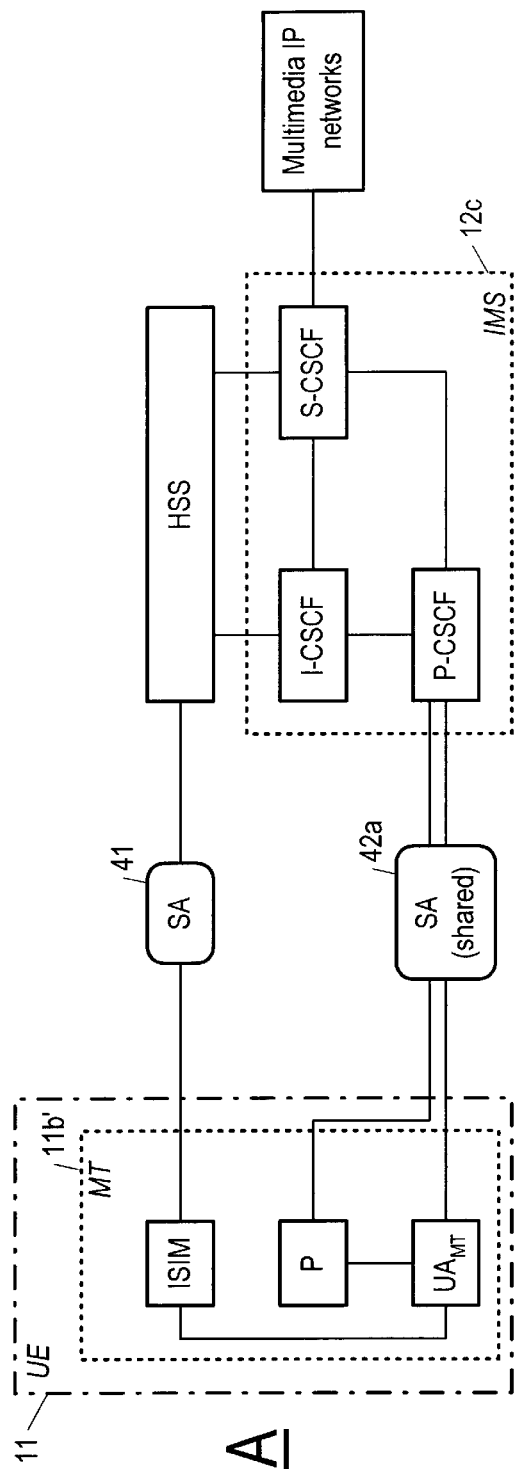
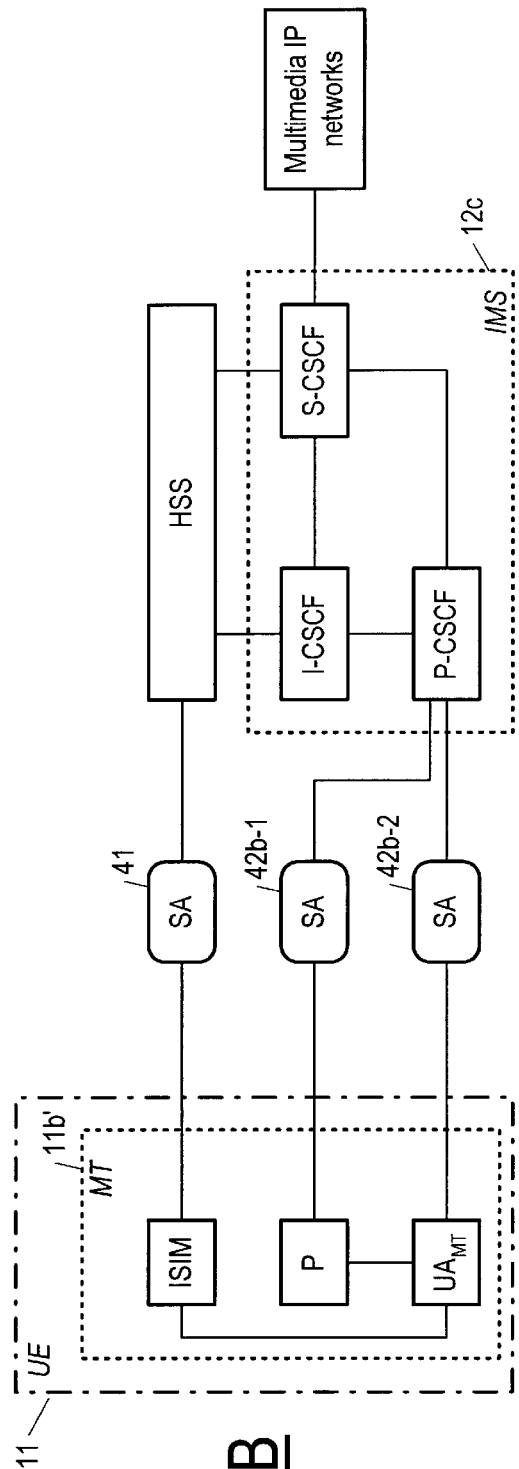
FIG. 4A
FIG. 4B

USER EQUIPMENT DEVICE ENABLED FOR SIP SIGNALLING TO PROVIDE MULTIMEDIA SERVICES WITH QOS

FIELD OF THE INVENTION

The invention pertains to so-called 3GPP (third generation partnership program) IMS (Internet Protocol Multimedia Subsystem) services, and more particularly to signaling to provide such services at an appropriate QoS level (quality of service).

BACKGROUND OF THE INVENTION

Today, via the Internet, two terminals (e.g. two PCs) can communicate voice, video and data and not only via strictly a wireline network, but also via a telecommunication system in which at least part of the communication path is wireless, and includes a radio access network (RAN), such as the RAN providing access to UMTS (Universal Mobile Telecommunications System) being developed under the auspices of 3GPP (Third Generation Partnership Program). To enable such multimedia (MM) communication between two terminals, the UMTS includes a component referred to as IMS (Internet Protocol Multimedia Subsystem).

The 3GPP system (UMTS) in its first release (R99) was designed to be backward compatible with the existing GSM (Global System for Mobile Communications) circuit switched infrastructure. As the costs to procure and maintain the very proprietary hardware of circuit switched systems are very high, and much of the bandwidth used to transmit user data is lost, the 3GPP system is slowly evolving toward an all-IP core network, and so the existing circuit switched infrastructure will ultimately be outdated and replaced by IP-based hardware, which is open, scalable, and cheaper to procure and maintain due to a more competitive market. Thus, through REL-4 and REL-5 of the 3GPP specifications, more and more importance is given to IP-based architecture, and the IMS is introduced, firstly to handle classical circuit switched services (like voice) over IP (VoIP), secondly to handle all multimedia services provided to subscribers.

As shown in FIG. 1A, the IMS (IP Multimedia Subsystem) is an extension of the PS (packet-switched) Core Network (CN) of UMTS, intended to become independent of the PS-CN from REL-6 on. It uses the Session Initiation Protocol (SIP) to set up, maintain and terminate voice and multimedia sessions. An example of such a session is a series of communications in which a user is first engaged in a voice communication, and then receives an incoming IP video communication, but decides not to accept the communication, and instead diverts the incoming video to a messaging system (which then posts in the user's mail box a message indicating that the user has new mail, i.e. the video message).

SIP is a part of the overall Internet Engineering Task Force (IETF) multimedia data and control architecture. It is used in conjunction with other IETF protocols, such as the Session Description Protocol (SDP) and the Real-Time Protocol (RTP). SIP is a signaling protocol for handling the setup, modification, and teardown of MM sessions, and in combination with the protocols with which it is used, describes the session characteristics of a communication session to potential session participants. Usually, RTP is used to exchange the media (audio, voice or data) during the communication session, but SIP allows any transport protocol to be used. Also, usually, the SIP messages (signaling) pass through some of the same equipment as the media to be exchanged during a communication session, but it is important to maintain a logical separation between SIP signaling and the communication of the media (the session data), because the SIP signaling for a communication session might pass through one or more proxy servers while the media stream uses a more direct path between the participants in the communication session.

As also shown in FIG. 1A (and also in FIG. 1B), because of the services provided by IMS 12c included in the CN PS domain 12b, and as already indicated above, a PC/TE 11a coupled to UMTS via a MT (mobile terminal) 11b can communicate voice, video and data with another PC 14 connected to the Internet 15. The PC/TE 11a can communicate with the MT 11b in any of various ways, including for example using Bluetooth (BT). In such a communication, the PC/TE 11a and the MT 11b, so coupled, in combination make up what is called user equipment (UE). In general, a UE device is an MT coupled to a terminal equipment (TE) device such as, but not necessarily restricted to a PC; a UE device can be an IMS-enabled mobile phone, including a MT coupled to a TE device that is a specialized processor, not what is generally referred to as a PC. But it should be realized that these are logical entities that can be combined in a single physical device.

When using IMS, user identification is based on a unique private identity, used only by the UE and the core network, an identity comparable in function to the IMSI (International Mobile Subscriber Identity) and also based on public identities used by third parties to address a user (and typically written on business cards and the like). Authentication uses the principles of UMTS AKA (authentication and key agreement), the 3GPP authentication scheme. The authentication for IMS is separated from UMTS authentication and the secret keys and functions for IMS usage are independent from the secret keys and functions used in the UMTS subscription (also needed to access IMS), but can be the same. The idea is that a UE starts a MM communication via IMS by establishing a PDP (packet data protocol) context with GGSN via SGSN, and so is identified and authenticated in the PS domain before it identifies and authenticates in the IMS domain. When IMS becomes access independent as planned, one will be able to think of a UE connecting to IMS via a WLAN (wireless local area network) or a fixed LAN, thus requiring specific access credentials for the access network, while gaining access to IMS services by satisfying IMS-specific authentication requirements.

The IMS protocols used to set up a data flow between a UE device (including a PC/TE) and an IMS server are IPv6 (Internet Protocol version 6) and the above-mentioned SIP, and more specifically, SIP with SDP. For IMS, SIP includes extensions not found in the earlier, original SIP, per the IETF RFC (request for comments) 2543 nor found in the new updated version of SIP RFC 3261. According to the MT-TE split now being considered, there is a UA (user agent) in the TE (e.g. a PC) that knows SIP without all extensions and improvements required for IMS clients, and the TE is able to use 3GPP IMS services transparently. Since IMS services include RT (Real time) a data flows (voice, video, or data) it requires QoS support from the underlying network. The QoS has to be set up end-to-end so that the user will experience the QoS subscribed to and paid for. The SIP extensions allow for providing such QoS, among other services, such as security. (With a split TE-MT arrangement, a TE can use more than one data flow and with different QoS characteristics at a time, there being a PDP context for each data flow, and the QoS characteristics for each data flow, including the local connection between MT and TE, can be set separately.)

If the SIP extensions providing IMS SIP are implemented in the UA of the TE, then the UA ends up being more intelligent (i.e. "knows" more signaling) and so more complex than is necessary in many circumstances (where IMS services are not being invoked, i.e. in circumstances where the MT is not functioning as an IP router, classifying each IP packet and putting it in an appropriate PDP context).

What is needed is a way to implement (i.e. to provide for a way to respond to) SIP extensions without making the UA unnecessarily complex.

SUMMARY OF THE INVENTION

Accordingly, the present invention provides a user equipment (UE) device including a mobile terminal (MT) coupled to a terminal equipment (TE) device, for use in multimedia communication requests for internet protocol (IP) communications across a packet switched communication network where the multimedia communication requests are made using signaling according to a predetermined protocol, the TE including a user agent for providing a communication establishment message as part of the signaling and including a session description protocol (SDP) component, the UE device characterized by: an IMS proxy adjunct, located in the TE device, responsive to the communication establishment message and other messages including the SDP component, for making extensions to the communication establishment message and other messages by extending the SDP component so as to reserve resources ensuring a predetermined quality of service (QoS) for the IP communications, and for originating and terminating messages according to the predetermined protocol on behalf of the user agent in the TE device so that the packet switched communication network need not take into account the operation of the IMS proxy adjunct; and an IP router and QoS manager, located in the MT, responsive to control signals provided by the IMS proxy adjunct, for providing QoS using access network specific procedures to open QoS enabled IP flows, and routing IP packets to different QoS enabled IP flows.

In accord with the first aspect of the invention, the IMS proxy adjunct may configure the local media used between MT and TE according to a required QoS level.

Also in accord with the first aspect of the invention, the IMS proxy adjunct may extend the signaling, in addition to by adding extensions to the communication establishment message and other messages, by also modifying headers, extending the SDP component, originating requests and providing responses on behalf of the terminal equipment (TE) device for any IMS required functionality.

Still also in accord with the first aspect of the invention, the MT may also include an IMS proxy (as opposed to the IMS proxy adjunct in the TE), responsive to the communication establishment message with the extended SDP, for providing a finalized communication establishment message with the extended SDP to the packet switched communication network via a radio access network, and for managing the QoS of the packet switched communication network for multimedia communication data flows. Also, the IMS proxy adjunct may also respond to messages used in a communication establishment sequence provided by the packet switched communication network via the IMS proxy or provided directly from the packet switched communication network by removing extensions from the SDP and providing the communication establishment messages without any extensions. Also still, the predetermined protocol may be the session initiation protocol (SIP) and the MT may be operative according to a procedure for registering with an Internet Protocol (IP) Multimedia Subsystem (IMS) server so as to allow the MT to access, over a digital communication system, an IP multimedia service to which the MT is subscribed, the procedure including having the MT send an SIP register message to a proxy call session control function (P-CSCF), and the SIP register message sent according to the procedure may include a field conveying information indicating whether the MT includes IMS proxy functionality; further still, in a registration coming from the TE, the IMS proxy in the MT may add a field conveying addressing information so that the IMS server is able to route subsequent SIP signaling through the IMS proxy.

In a second aspect of the invention, a method is provided by which the UE device according to the first aspect of the invention is operative.

BRIEF DESCRIPTION OF THE DRAWINGS

The above and other objects, features and advantages of the invention will become apparent from a consideration of the subsequent detailed description presented in connection with accompanying drawings, in which:

FIG. 1A and FIG. 1B are block diagrams of user equipment (a mobile terminal coupled to a terminal equipment device) including an IMS proxy adjunct P+ according to the invention, for use in setting up an SIP call via IMS, shown in context with UMTS and showing specifically the IMS component of UMTS, and also including an ISIM (IMS subscriber identity module), FIG. 1B for an embodiment in which the mobile terminal includes an IMS proxy P, and FIG. 1A for an embodiment in which the mobile terminal does not include an IMS proxy;

FIG. 4A is a block diagram indicating communication between the user equipment and IMS according to a first aspect of the invention in respect to the mobile terminal of FIG. 1B informing the IMS server that the mobile terminal has IMS proxy capabilities, i.e. includes the IMS proxy P;

FIG. 4B is a block diagram indicating communication between the user equipment and IMS according to a second aspect of the invention in respect to the mobile terminal of FIG. 1B informing the IMS server that the mobile terminal has IMS proxy capabilities;

BEST MODE FOR CARRYING OUT THE INVENTION

An IMS Proxy Adjunct P+

Figure 2A:
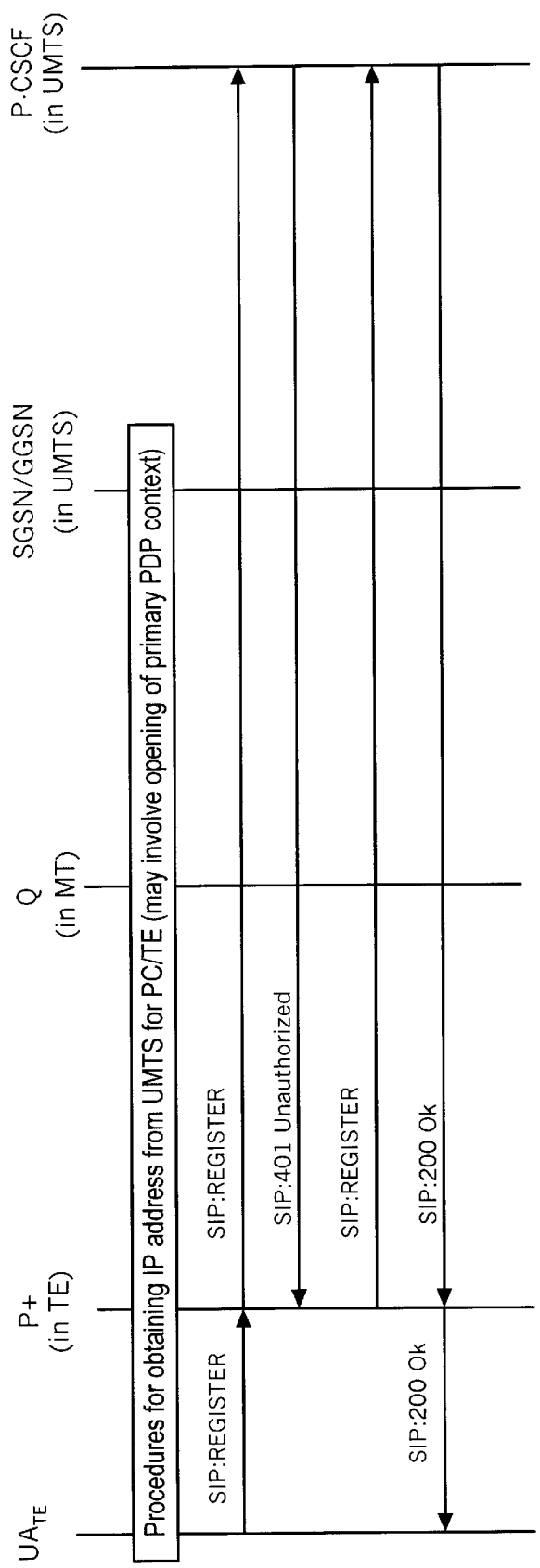
FIG. 2A is a message sequence diagram showing messages for registering the PC/TE of FIG. 1A with the IMS component of UTMS.

Referring now to FIG. 1A, so as to support QoS for SIP calls (including possibly voice, video and data) to or from a UE device 11 (including an MT 11b and a TE device 11a such as a PC) routed via the UMTS 12 to a PC 14 connected to the Internet 15, an IMS proxy adjunct P+ is provided as part of the TE for adding the required SIP extensions (to SIP messages) and for acting as the local QoS management agent for the local connection (between TE and MT), and an IP router and QoS manager Q is also provided as a part of the MT for managing the resources of the access network being used, for example GPRS/UMTS. Q opens up the PDP contexts, sets up the correct QoS parameters for UMTS and routes the IP packets to the correct PDP contexts and back to the correct TEs. Local media QoS management includes e.g. BT (Bluetooth), USB (Universal Serial Bus), and WLAN (Wireless Local Area Network) resource reservation and setting of communication channel parameters. The IMS proxy adjunct P+ provides the SIP extensions to the SIP messages created by a (prior art) UA included in the PC/TE 11a, indicated as $UA_{TE}$. The SIP messages so constructed are used to access IMS services provided by an IMS server 12c included as part of the PS CN (packet-switched core network) 12b of the UMTS 12, the access being provided via a radio connection to the RAN 12a, which may be a UTRAN or other kind of RAN, including a GSM (Global System for Mobile communications)/EDGE (Enhanced Data Rates for GSM Evolution) RAN (i.e. a GERAN). The PS CN includes a SGSN (Serving GPRS (General Packet Radio Service) Support Node) 12d and a GGSN (Gateway GPRS Support Node) 12e. The UMTS 12 also includes a HSS (Home Subscriber Server) used in authenticating UE devices making calls via UMTS.

In the SIP signaling of SIP messages to set up the SIP call between the UE device 11 and the PC 14, the IMS (network of) servers 12c proxy the SIP messages. After the SIP call is set up, the user data flows between the UE device 11 and the PC 14 without (necessarily) involving the IMS servers 12c, i.e. along the path within the PS CN including only the SGSN 12d and the GGSN 12e (although there might be a need for transcoding of the media if different codecs are used, in which case there might be some IMS servers involved); moreover, the user data does not flow through the IMS proxy adjunct P+, but flows directly from the $UA_{TE}$ 11a to the IP router and QoS manager Q of the MT 11b and on to the CN. Because the PC 14 is connected to the Internet 15 via a wireline or wireless connection, it communicates with the IMS server 12c via the Internet 15 directly. It is of course also possible that the PC 14 could be in radio communication with the UE device 11 (if it is coupled to a MT) and so would also rely on an SGSN and a GGSN to communicate with the IMS servers 12c. The PC 14 would then also include an IMS proxy adjunct P+ according to the invention.

Referring now to FIG. 1B, an embodiment is illustrated showing an MT 11b' including an IMS proxy P in addition to the IP router and QoS manager Q. In such an embodiment, the IMS proxy P (in the MT 11b') controls the Q element, and must identify itself to the IMS servers 12c, providing to IMS its address (among other information). The address could, for example, be conveyed in a Path header of a REGISTER message. (Path is an existing SIP extension header used in IMS REGISTER messages.)

In both the embodiment shown in FIG. 1A and also that shown in FIG. 1B, IMS proxy adjunct P+ examines the SDP (session description protocol) message (used to negotiate the session details) carried inside of the different SIP messages involved in setting up a session and may modify them. In the embodiment of FIG. 1A, the IMS proxy adjunct P+ also signals the QoS requirement directly to Q using some other generic QoS protocol, such as RSVP (Resource ReserVation Protocol), whereas in the embodiment of FIG. 1B, the signaling is done using SIP/SDP (or some other protocol combination such as RTSP (real time streaming protocol)/SDP). The IMS proxy adjunct P+ of both embodiments performs the same functions, but the implementations in FIG. 1A and FIG. 1B are different in that in FIG. 1A, an additional protocol stack is used.

In FIG. 1B, the IMS proxy P is positioned alongside the $UA_{MT}$ to indicate that both exist in the same protocol layer and are using Q to provide IP layer services. The interaction between the two entities P and $UA_{MT}$ indicated in FIG. 1B (by the line connecting the two entities) is for internal information exchange, e.g. to convey port numbers; it is not a protocol interface.

Referring now to FIG. 2A, according to the invention, in a registration from a PC/TE coupled to an MT, where the TE has requested one IP address via MT from the UMTS network and MT has initiated radio access (e.g. performing radio bearer setup, activating required PDP contexts), after the $UA_{TE}$ has sent the first message which can be SIP REGISTER to IMS proxy adjunct P+ of the TE the IMS proxy adjunct P+ (hosted by the PC/TE 11a) sends the REGISTER SIP MESSAGE to IMS 12c so that it will get the terminating calls and so that IMS has all needed information to accept calls originated by $UA_{TE}$. Upon receiving an SIP unauthorized message with AKA challenge (SIP.401 Unauthorized), the IMS proxy adjunct P+ performs authentication procedures required for IMS access, and issues a new REGISTER message containing the AKA response. The final response "200 Ok" is forwarded to $UA_{TE}$.

Figure 3A:
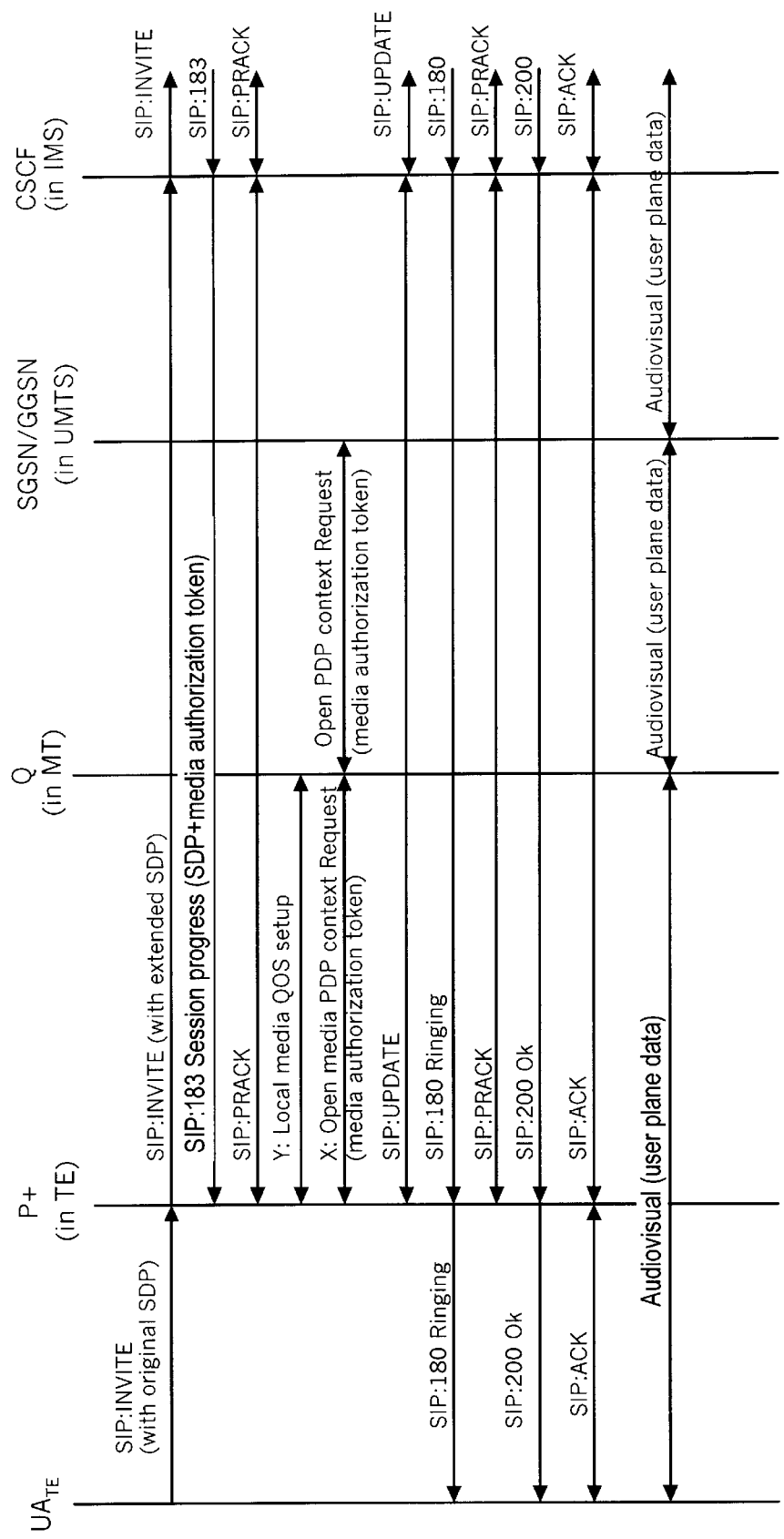
FIG. 3A is a message sequence diagram showing messages for setting up a call originating in the terminal equipment device of FIG. 1A, with the messages according to the SIP protocol as extended by the IMS proxy adjunct to provide QoS, according to the invention.

Referring now to FIG. 3A, according to the invention, in a call originating from a PC/TE coupled to an MT where the $UA_{TE}$ has successfully performed registration with IMS 12c as described above, the IMS proxy adjunct P+ (hosted by the PC/TE 11a) receives from the $UA_{TE}$ 11a a session initiation message, which can be an INVITE SIP message (including an SDP in its message body), parses it, and so determines what kind of session is being requested. From the SDP parameters (indicating media type (voice/audio), protocol, IP address and port, and required bandwidth), the IMS proxy adjunct P+ creates an extended (more detailed) SDP message with resource reservation extensions corresponding to the SDP parameters. The IMS proxy adjunct P+ sends the INVITE message with the extended SDP message to the next IMS proxy, in this case P-CSCF (proxy call session control function) of IMS; (the P-CSCF is introduced below in the background on IMS). When the "183 Session Progress" message arrives from IMS (sent to IMS by the terminating party), the IMS proxy adjunct P+ of the TE examines the SDP message and makes resource reservations and sets up the appropriate QoS parameters for the local connection (e.g. Bluetooth) using, for example, BT QoS API (application programming interface) and initiates signaling with Q of the MT, which will result in reserving resources for UMTS (setting-up appropriate PDP contexts and QoS attributes, based on mapping SDP parameters into UMTS QoS parameters). Thus, if there is an IMS proxy P in the MT, as in the embodiment indicated in FIG. 1B, the QoS signaling will be done between P+ and P, using SIP signaling. Now P controls the Q to reserve the UMTS part, and the IMS proxy adjunct P+ can reserve the local media part as in the embodiment indicated in FIG. 1A.

In another embodiment, referring again to FIG. 1B, the IMS proxy adjunct P+ (in the TE) controls the IMS proxy P (in the MT) via signaling that is other than SIP signaling, i.e. an embodiment in which SIP is not used as the QoS protocol.

Still referring to FIG. 3A, the IMS proxy adjunct P+ then sends the UPDATE request to the next hop IMS proxy to indicate that it has reserved the resources. Finally a 200 OK message indicating acceptance of the session is issued by the called party and when it reaches the IMS proxy adjunct P+ it is forwarded to the $UA_{TE}$ and the audio/video can then start to flow over the reserved so-called (communication) pipe. The user plane data flows directly to the IP router and QoS manager Q in the MT, without involving the IMS proxy adjunct P+ in the PC/TE.

Figure 2B:
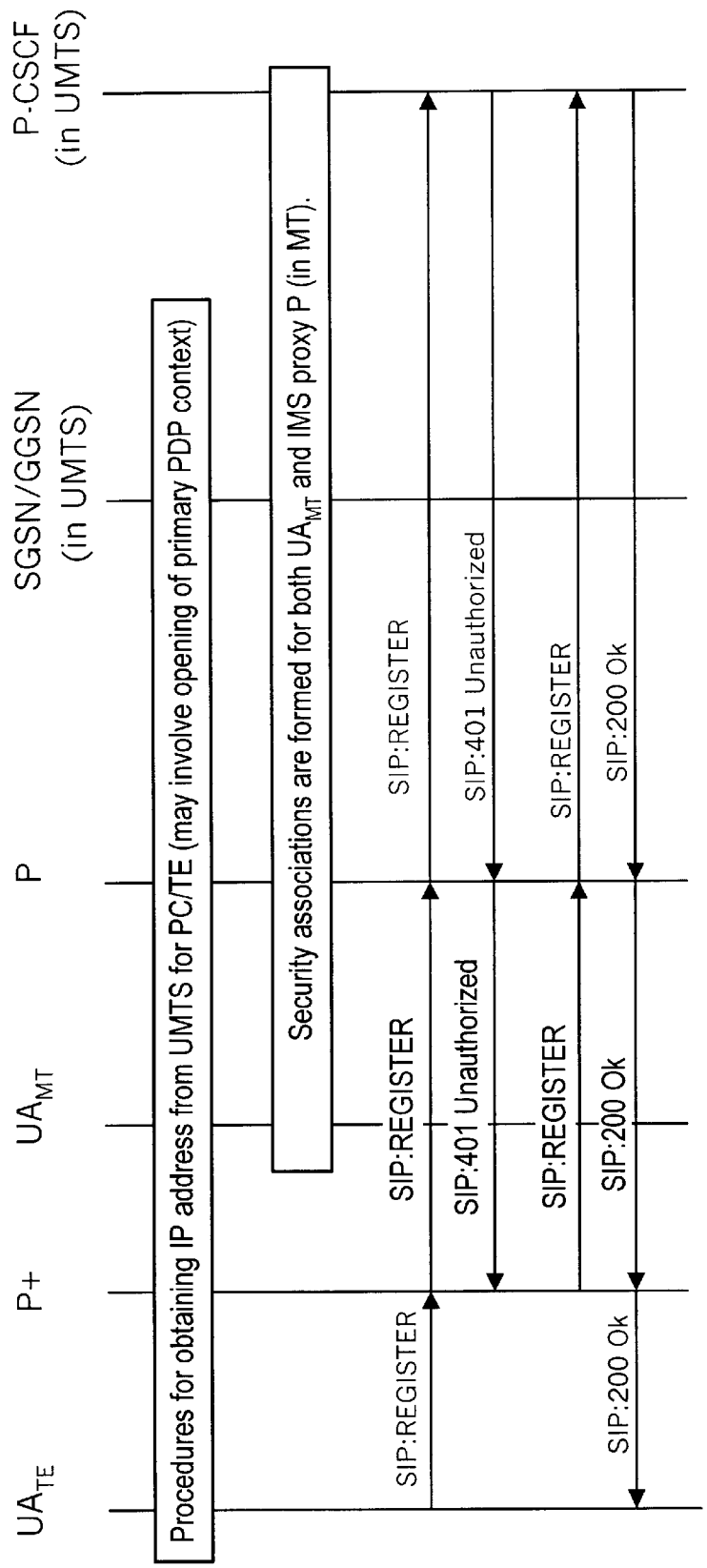
FIG. 2B is a message sequence diagram showing messages for registering the terminal equipment device of FIG. 1B with the IMS component of UTMS in the case the IMS proxy adjunct P+ has access to the ISIM and performs authentication on behalf of the a user agent of the terminal equipment device.

Referring now to FIG. 2B, according to the invention, in a registration from a PC/TE coupled to an MT where the TE has requested one IP address via MT from the UMTS network and MT has initiated radio access (e.g. performing radio bearer setup and activating required PDP contexts) and after the $UA_{MT}$ and the IMS proxy P have formed security associations with the P-CSCF of the IMS (as e.g. set out below in the descriptions of FIGS. 5A and 5B), once the $UA_{TE}$ has sent the first message, which can be an SIP REGISTER message, to the IMS proxy adjunct P+ of the PC/TE 11a, the IMS proxy adjunct P+ forwards the REGISTER message to the IMS proxy P in the MT 11b', and the IMS proxy P then sends the REGISTER SIP MESSAGE to the IMS 12c so that it will get the terminating calls and so that the IMS 12c has all the information needed to accept calls originated by the $UA_{TE}$. Upon receiving an SIP unauthorized message with AKA challenge (SIP.401 Unauthorized), the IMS proxy adjunct P+ performs authentication procedures required for IMS access, and issues a new REGISTER message containing the AKA response. The final response 200 Ok is forwarded to the $UA_{TE}$.

Figure 2C:
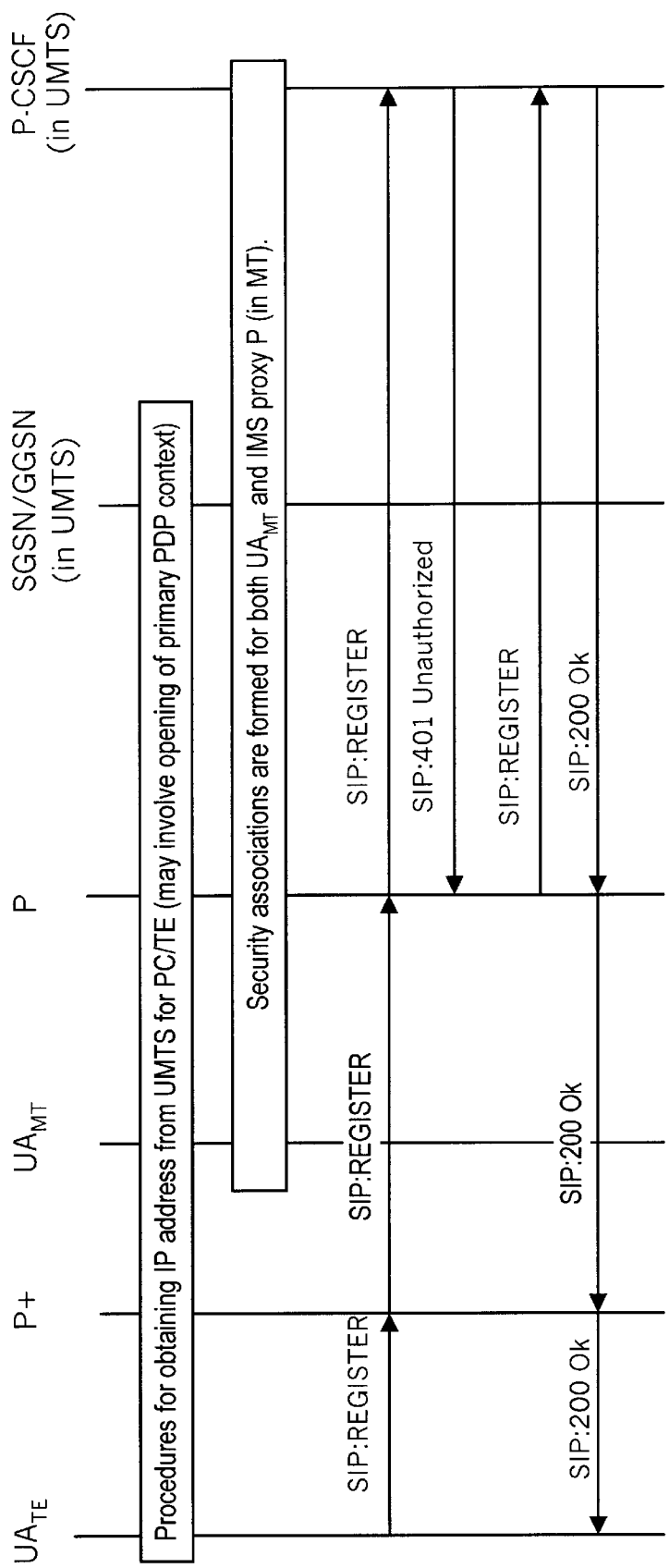
FIG. 2C is a message sequence diagram showing messages for registering the terminal equipment device of FIG. 1B with the IMS component of UTMS in the case the IMS proxy adjunct P+ does not have access to ISIM and the IMS proxy P of the mobile terminal performs the authentication on behalf of the user agent of the terminal equipment device, instead of the IMS proxy adjunct P+.

In addition to handling both QoS management and authentication, P+ can be used only to manage QoS, as indicated in FIG. 2C, showing authentication being performed by P, and so leaving P+ only the task of managing QoS.

Referring now to FIG. 2C, in another embodiment according to the invention, the message sequence diagram is the same as indicated in FIG. 2B except that instead of the IMS proxy adjunct P+ receiving and responding to the SIP unauthorized message with AKA challenge (SIP.401 Unauthorized), it is the IMS proxy P that does so.

Figure 3B:
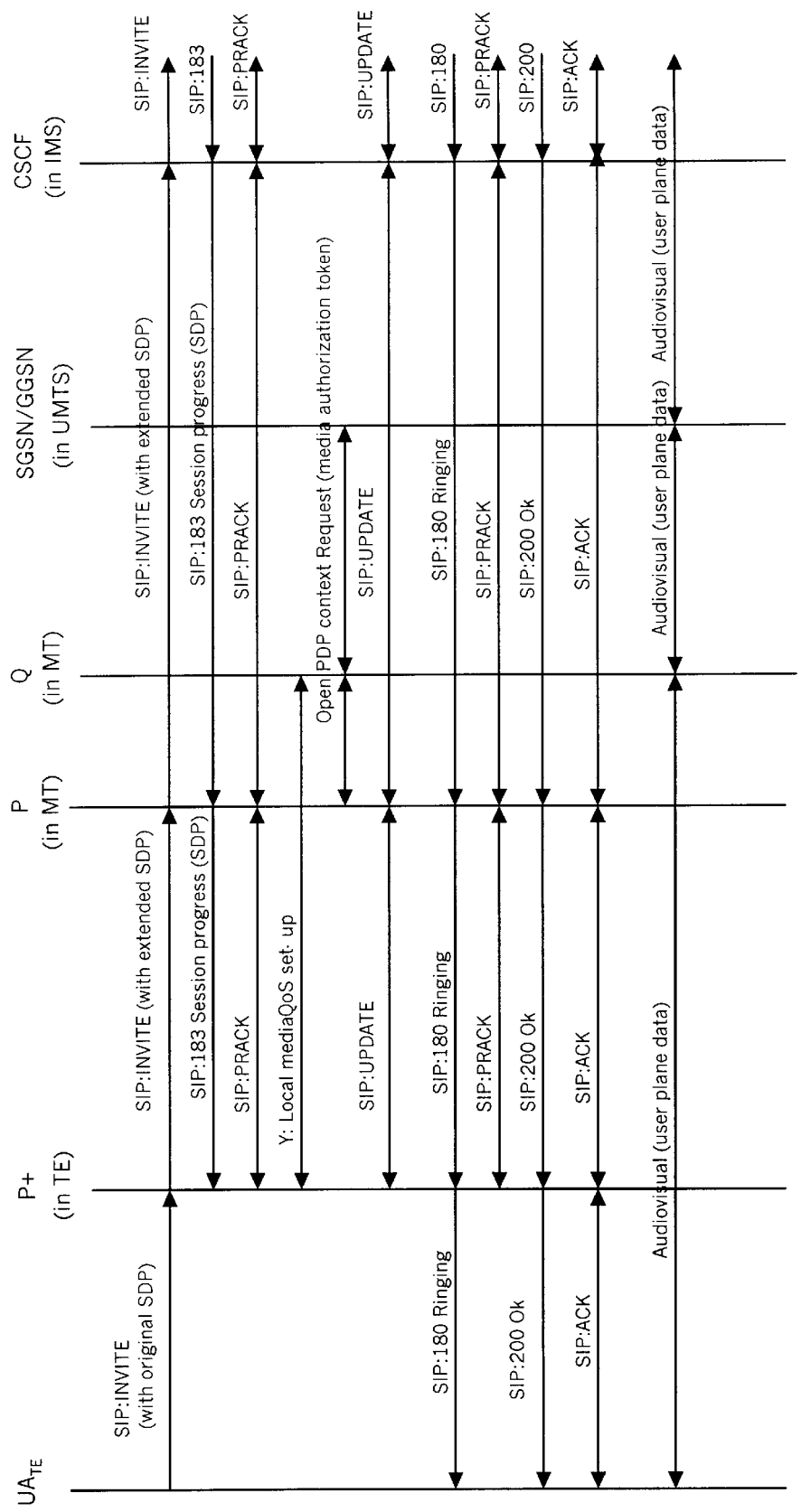
FIG. 3B is a message sequence diagram showing messages for setting up a call originating in the terminal equipment device of FIG. 1B, with the messages according to the SIP protocol as extended by the IMS proxy adjunct P+ to provide QoS, according to the invention.

Referring now to FIG. 3B, according to the invention, in a call originating from a PC/TE coupled to an MT where the $UA_{TE}$ has successfully performed registration with IMS 12c as described above, the IMS proxy adjunct P+ (hosted by the PC/TE 11a) receives from the $UA_{TE}$ 11a a session initiation message, which can be an INVITE SIP message (including an SDP in its message body), parses it, and so determines what kind of session is being requested. From the SDP parameters (indicating media type (voice/audio), protocol, IP address and port, and required bandwidth), the IMS proxy adjunct P+ creates an extended (more detailed) SDP with resource reservation extensions corresponding to the SDP parameters. The IMS proxy adjunct P+ sends the INVITE with the extended SDP to the next IMS proxy, in this case the IMS proxy P in MT 11b'. The IMS proxy P in the MT 11b' reads the extended SDP to determine if it is capable of providing the bit rates indicated by the SDP. After possible modifications to the SDP, the IMS proxy sends the INVITE to the next SIP server 12. When the "183 Session Progress" message arrives from IMS (sent to IMS by the terminating party), the IMS proxy P of the MT 11b' examines the SDP and makes resource reservations and reserves requested resources from UMTS (setting-up appropriate PDP contexts and QoS attributes, based on mapping SDP parameters into UMTS QoS parameters) and proxies the "183 Session Progress" message to IMS proxy adjunct P+ in TE. Upon receiving the "183 Session Progress" message, the IMS proxy adjunct P+ in TE reserves the resources for the local media (e.g. last meter) and set-up the required QoS parameters using, for example, BT QoS API (application programming interface). The IMS proxy adjunct P+ sends the UPDATE request to the next hop IMS proxy to indicate that it has reserved the resources. Finally a 200 OK message indicating acceptance of the session is issued by the called party and when it reaches the IMS proxy adjunct P+ it is forwarded to the $UA_{TE}$ and the audio/video can then start to flow over the reserved so-called (communication) pipe. The user plane data flows directly to the IP router and QoS manager Q in the MT, without involving the IMS proxy adjunct P+ in the PC/TE.

The IMS proxy adjunct P+ is preferably implemented as a software module and distributed with mobile phones for loading into a PC/TE. The software module could even be a more generic IMS proxy, as opposed to supporting SIP/SDP only, i.e. it could do similar tasks for several different protocols, such as RTSP. Implementing both the IMS proxy adjunct functionality and also the RTSP functionality would be straightforward since RTSP also uses SDP to describe the media to be used in a communication. In case of a generic IMS proxy, the software module could have a core (kernel) that would be the same for all protocols, but there could be protocol plug-ins for different IMS protocols.

The IMS proxy adjunct P+ could also have an SIP/SDP API for application programmers who want to make applications with improved performance (since an intermediate proxy would not be needed in TE). The programmer would use the SDP API to set up the SDP parameters, and the IMS proxy adjunct P+ would do the mapping and resource reservation as described above.

It should be understood that the IMS proxy adjunct P+ can be used not only to add SDP extensions needed for IMS (since SDP extensions for QoS are just a small part of the needed extended functionality) but also for adding other extensions needed by IMS. In addition, since the IMS proxy adjunct P+ handles also the registration, the IMS proxy adjunct P+ could also provide the AKA response. Also, as already mentioned, P+ could be used only to manage authentications. Further, the IMS proxy adjunct P+ could perform SIP header compression and other tasks, and could also issue new requests and responses. Thus, the IMS proxy adjunct P+ functionality can be substantially more than just adding extensions; it can also add SIP signaling and behavior, or signaling and behavior according to other protocols that provide messages including SDP components.

Mechanism for Notifying IMS of IMS Proxy Capability

Referring again to FIG. 1B, in addition to the functionality described above in connection with the IMS proxy adjunct P+ providing SIP extensions, the invention also provides mechanisms by which the MT 11b' (FIG. 1B) informs the IMS server 12c that it has IMS proxy capabilities (i.e. that it hosts the IMS proxy P). From the security point of view, we have two entities in the MT 11b': the $UA_{MT}$ and the IMS proxy P. While the signaling between the $UA_{MT}$ in the MT 11b' and the P-CSCF is protected by a SA (security association) provided according to FIG. 1 of 3GPP TS 33.203 v. 5.2.0, the prior art does not provide the same trust knowledge about the IMS proxy. In addition, the "Via:" headers added by the IMS proxy must be recognized in the network (P-CSCF). According to previous network architecture (3GPP Release 5), the added "Via:" header is not legitimate as long as there is an $UA_{MT}$ serving as the end point in the SIP network.

Figure 5A:
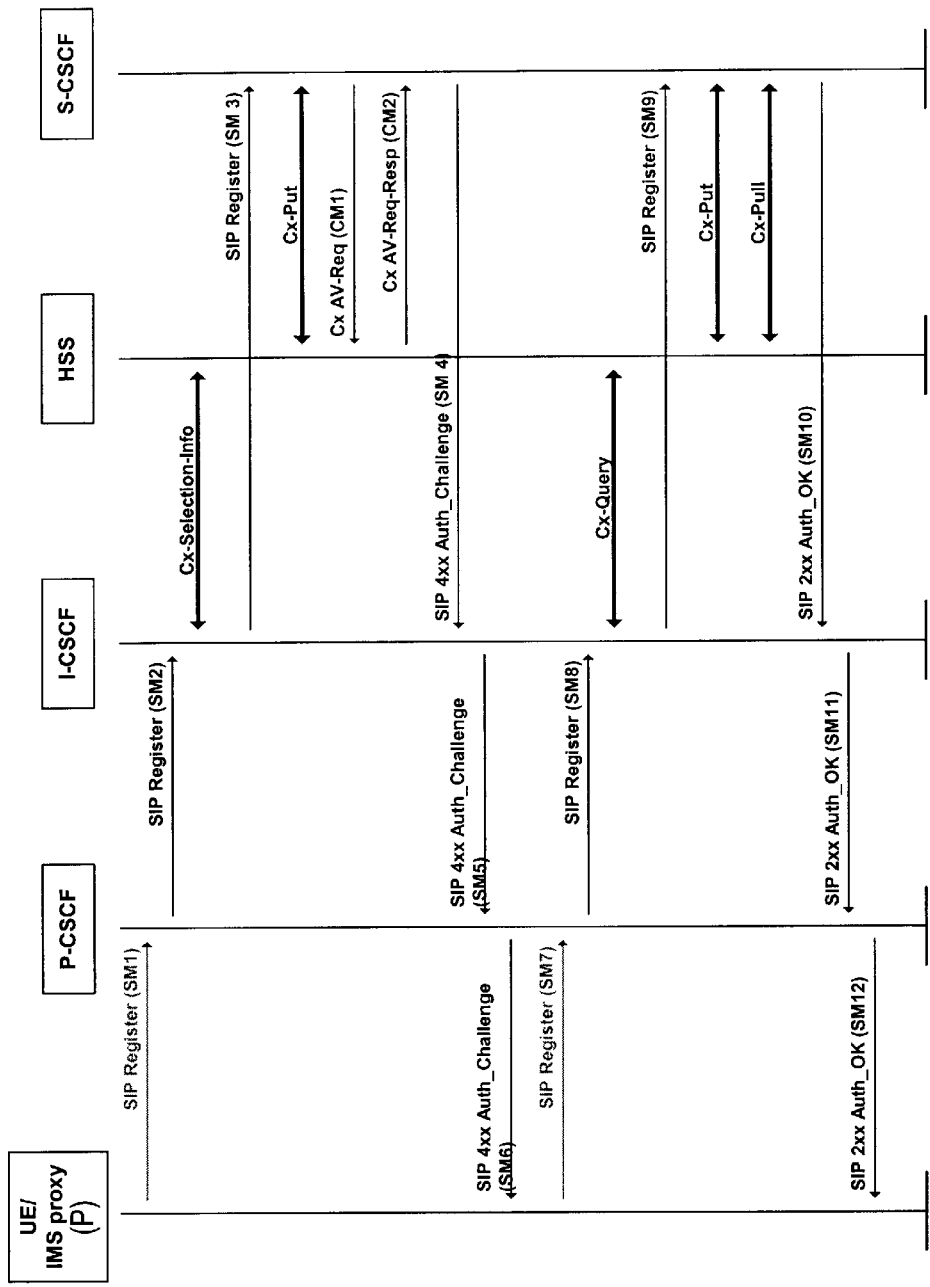
FIG. 5A is a message sequence diagram in which the mobile terminal of the user equipment of FIG. 1B is authenticated and indicates to IMS that it includes IMS proxy functionality, according to the invention corresponding to the arrangement illustrated in FIG. 4A.
Figure 5B:
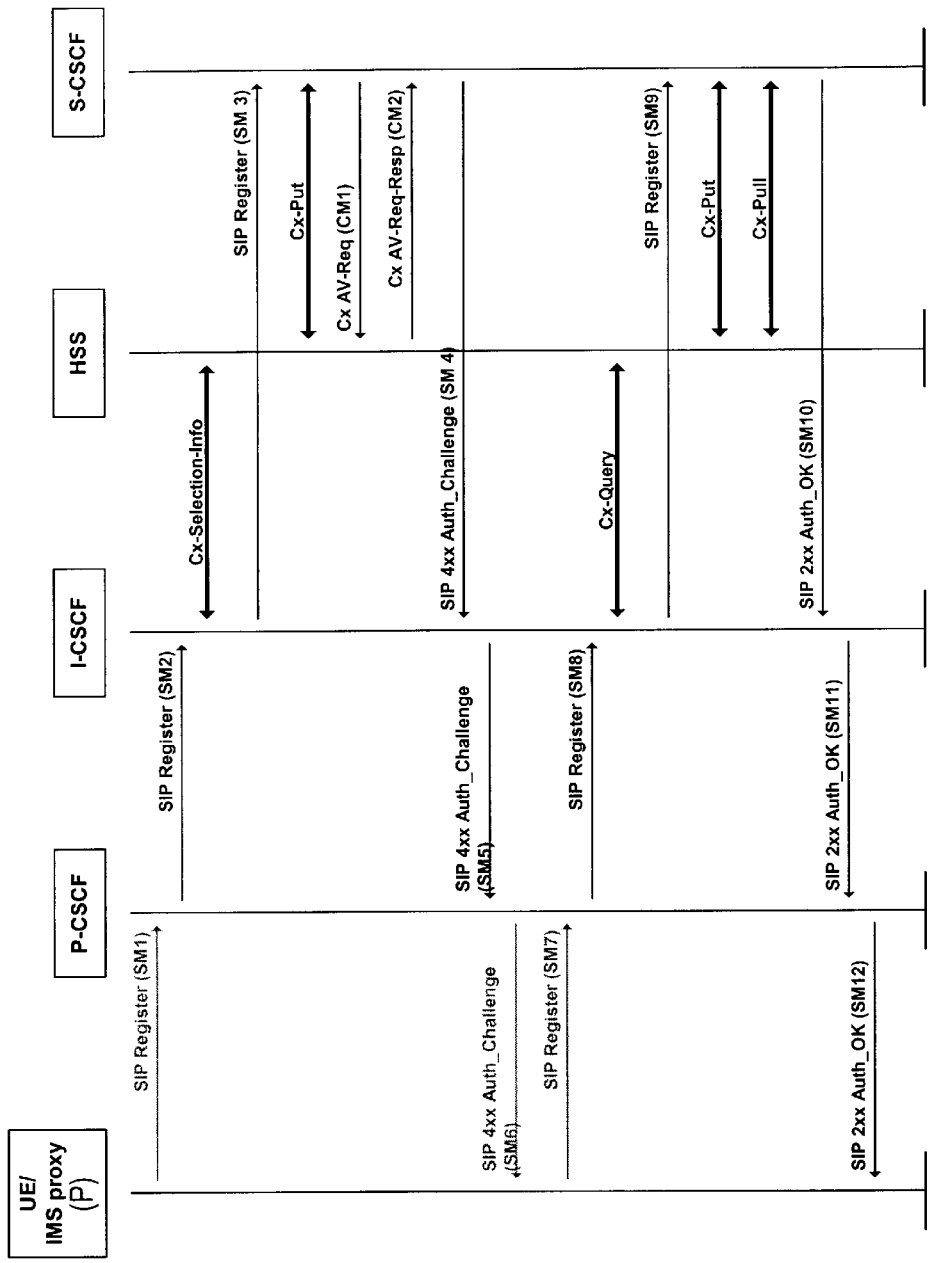
FIG. 5B is a message sequence diagram in which the mobile terminal of the user equipment of FIG. 1B is authenticated and indicates to IMS that it includes IMS proxy functionality, according to the invention corresponding to the arrangement illustrated in FIG. 4B.

The invention in respect to the MT 11b' (FIG. 1B) informing the IMS server 12c that the MT has IMS proxy capabilities includes two embodiments: a signaling mechanism indicated in FIG. 5A corresponding to the arrangement illustrated in FIG. 4A in which a SA 42a is established according to the TS 33.203 and is shared by the $UA_{MT}$ and the MT IMS proxy P for communicating with the P-CSCF; and a signaling mechanism indicated in FIG. 5B corresponding to the arrangement illustrated in FIG. 4B in which during the registration process described in TS 33.203, a new SA 42b-1, different from that provided by TS 33.203, is established between the MT IMS proxy P and the P-CSCF, and a SA 42b-2 is established between the $UA_{MT}$ and the P-CSCF according to TS 33.203.

It should be understood that the invention in respect to the MT 11b' (FIG. 1B) informing the IMS server 12c that the MT has IMS proxy capabilities does not require an IMS proxy adjunct P+ in the PC(TE) 11a, and so does not in any way depend on SIP signaling between an IMS proxy adjunct P+ and the IMS proxy P (of the MT 11b').

The mechanisms of the invention are based on IMS AKA (IMS Authentication and Key Agreement) as described in TS 33.203. The message sequence chart of TS 33.203 is left unchanged by the invention, but the invention adds new fields (extension headers) to some messages, and some extra operations are performed in some network elements, between receiving a message and sending a message in response. Before describing the mechanisms also provided by the invention (in addition to the IMS proxy adjunct P+), it is perhaps helpful to describe the architecture of IMS and IMS AKA.

Background on IMS and IMS AKA

Referring now to FIGS. 1 and 4B and disregarding for the moment the SA 42b-1 between the IMS proxy P and the P-CSCF, the IMS security architecture according to 3GPP TS 33.203 is shown as including various instances of a Call Session Control Function (CSCF) (i.e. a proxy CSCF (P-CSCF), an interrogating CSCF (I-CSCF), and a serving CSCF (S-CSCF)). The I-CSCF and the S-CSCF interface with the HSS (also shown in FIG. 1). The HSS is the master database for a given user; it is the entity containing the subscription-related information to support the network entities actually handling calls/sessions. FIG. 4B shows communication between various of the elements of the UE 11 (see also FIG. 1B) and various elements of the IMS 12c, without showing elements of the RAN 12a or the SGSN and GGSN that facilitate the communication.

In the PS domain, service is not provided to the UE 11 by the UMTS 12 (or other 3G wireless communication network) until a SA is established by IMS between the UE and UMTS. IMS operates independently from what is occurring in the PS domain, and so a separate SA (i.e. separate from the SA granting access to the PS domain) is required between a multimedia client and the IMS before access is granted by IMS to multimedia services.

As shown in FIGS. 1A, 1B and 4B, a so-called IM Services Identity Module (ISIM) is provided as part of the UE and is responsible for keys, sequence numbers (SQNs), and other similar objects/parameters tailored to the IMS. (The ISIM can be located in either the PC(TE) or the MT, as indicated by showing the ISIM as both a solid block and a dashed block in FIG. 1A. In FIG. 1B the dashed ISIM in the TE indicates that it is optional; in the embodiment shown in FIG. 1B there can actually be two different ISIMs, one for TE and one for MT, with the optional ISIM in the TE being used to add security, although the TE devices can register without it.) The security parameters handled by an ISIM are independent of corresponding security parameters for the User Services Identity Module (USIM) included in the MT of a UE device and used in cellular communications not relying on IMS.

IMS includes a CSCF that can act as either the proxy CSCF, in which case it is called a P-CSCF, or as the serving CSCF, in which case it is called the S-CSCF, or can act as an interrogating CSCF, in which case it is called the I-CSCF. The P-CSCF is characterized by being the first contact point for the UE within the IMS; the S-CSCF actually handles the session states in the network; and the I-CSCF is mainly the contact point within an operator's network for all IMS.

According to TS 33.203, an IM subscriber has its subscriber profile located in the HSS in the home network. At registration, an S-CSCF is assigned to the subscriber by the I-CSCF. When the subscriber requests an IM service, the S-CSCF checks, by matching the request with the subscriber profile, whether the subscriber is allowed to continue with the request.

The mechanism for registration in UMTS is called UMTS AKA, which is a challenge response (secure) protocol. The corresponding mechanism for multimedia services is called IMS AKA and it uses the same concepts and principles as UMTS AKA; in particular, the home network authenticates a subscriber only via registrations (or re-registrations). IMS AKA provides shared keys for protecting IMS signaling between the UE and the P-CSCF. To protect IMS signaling between the UE and the P-CSCF it is also necessary to agree on a protection method (e.g. an integrity protection method) and a set of parameters specific to the protection method, e.g. the cryptographic algorithm to be used. The parameters negotiated are typically part of what is called the security association (SA). The set of parameters includes: an authentication (integrity) algorithm and, optionally, an encryption algorithm; a SA_ID used to uniquely identify the SA at the receiving side; and a key length, i.e. the length of encryption and authentication (integrity) keys, which is usually taken to be 128 bits.

Before a UE can get access to IM services, at least one IM Public Identity (IMPU) of the UE must be registered and the IM Private Identity (IMPI) of the UE authenticated in the IMS at the application level.

Referring now to FIG. 5A (or 5B), in order to be registered, the UE sends an SIP REGISTER message SM1 (SIP message 1) to the SIP registrar server, i.e. the S-CSCF, via the P-CSCF and the I-CSCF; the S-CSCF then authenticates the UE. When the P-CSCF and the I-CSCF forward the SIP REGISTER to the S-CSCF as respective messages SM2 and SM3, they include their addresses in the messages.

In order to handle mobile-terminated calls while the initial registration is in progress, the S-CSCF sends to the HSS a registration flag (via a Cx-Put), which the HSS stores together with the S-CSCF name. The aim of using a registration flag is to indicate whether a particular IMPU of the UE is unregistered or registered at a particular S-CSCF or if the initial registration at a particular S-CSCF is pending. The HSS receives the information about this state (together with the S-CSCF name and the UE identity) from the S-CSCF with which registration/reregistration of the user is carried out only when a Cx-Put message is sent from the S-CSCF to the HSS. The registration flag is set to initial registration pending at the Cx-Put procedure after message SM3 is received by the S-CSCF.

Upon receiving the SIP REGISTER, the S-CSCF needs one authentication vector (AV) that includes a challenge. As an option, the S-CSCF can require more than one AV. If the S-CSCF has no valid AV, then the S-CSCF sends a request for one or more AVs to the HSS in a message connection (Cx) message 1 (CM1). If the HSS has no pre-computed AVs, the HSS creates the needed AVs for the UE and sends them to the S-CSCF in a message CM2.

The S-CSCF then sends an SIP 4xx Auth_Challenge (an authentication challenge) as a message SM4, intended for the UE, including a random challenge (RAND), an authentication token (AUTN), an integrity key (IK), and, optionally, a cipher key (CK). The SM4 is received by the I-CSCF, which forwards it to the P-CSCF as a message SM5. When the P-CSCF receives the message SM5, it stores the key(s), removes the key information from the message SM5, and forwards the rest of the message to the UE as a message SM6.

Upon receiving the message SM6 (i.e. the challenge), the UE takes the authorization token AUTN, which includes a Message Authentication Code (MAC) and the SQN, calculates the Expected MAC (XMAC), and checks that the XMAC is the same as the MAC and that the SQN is in the correct range (as per TS 33.102). If both checks are successful, the UE calculates the response RES, puts it into the authorization header, and sends it back to the registrar in a message SM7. The UE also computes the session keys CK and TK at this same point in the sequence.

The P-CSCF forwards the response RES to the I-CSCF in a message SM8, which queries the HSS to find the address of the S-CSCF. The I-CSCF forwards the RES to the S-CSCF in a message SM9. Upon receiving the response RES, the S-CSCF retrieves the active expected response (XRES) for the UE and checks if the XRES is the same as RES. If the check is successful, then the UE is deemed authenticated, and the IMPU is registered in the S-CSCF.

At this stage, after receiving the message SM9 and registering the UE (if all checks are successful), the S-CSCF sends in a Cx-Put an update of the registration-flag. If the authentication of the UE is successful, the registration flag takes the value registered; when the authentication is unsuccessful the registration flag is set to unregistered. The authentication is communicated to the UE as a 2xx_Auth_ OK message, provided by the S-CSCF to the I-CSCF as a message SM10, which is forwarded to the P-CSCF as a message SM11, which is then finally provided to the UE as a message SM12.

When a UE is registered, the registration is valid for a predetermined period of time. (Both the UE and the S-CSCF keep track of the time on a timer for this purpose, but the expiration time in the UE is smaller than the expiration time in the S-CSCF in order to make it possible for the UE to be registered and to be reachable without interruption.)

Additions to the Messaging Sequence

The MT needs not only to announce to the P-CSCF that is includes IMS proxy capability (i.e. that it includes an IMS proxy module P), but it also needs to set up the SAs between the IMS proxy P and the P-CSCF. Referring now (again) to FIGS. 4A and 4B, the invention provides two ways of doing so: in the first way, the scope of the existing SA established between the $UA_{MT}$ and the P-CSCF according to TS 33.203 v5.2.0 is extended so that it can be shared by the $UA_{MT}$ and the IMS proxy P in the MT, thus providing the SA 42a indicated in FIG. 4A; in the second way, a new SA 42b-1 is created for the IMS proxy P/P-CSCF communication, and using an SA 42b-2 according to TS 33.203 for the $UA_{MT}$/P-CSCF communication.

Referring now to FIG. 4A and also to FIG. 5A, for the case that the IMS proxy P and the $UA_{MT}$ share the same SA 42, the SM1 message according to the invention contains one new field that indicates the IMS proxy capability. The same new field is added to the message SM7 to provide for confirmation. (SM7 is already integrity protected, while SM1 is not.)

Referring now to FIG. 4B and also to FIG. 5B, for the case that signaling between the IMS proxy P and the P-CSCF is protected by a new SA 42b-1, different from the SA 42b-2 protecting signaling between the $UA_{MT}$ and the P-CSCF, the parameters of the new SA 42b-1 are negotiated inside messages SM1, SM6, SM7 in a similar fashion as for the SA 42b-2 between the $UA_{MT}$ and the P-CSCF. The keys needed to establish the new SA 42b-1 are obtained from the keying material TK and CK, computed according to the TS 33.203 as follows:

$IK(P)=SHA1(IK|0)$, and $CK(P)=SHA1(CK|0)$.

To implement the mechanism by which the MT makes the IMS server aware that it includes the IMS proxy P, the functionality of the $UA_{MT}$ and the P-CSCF should be expanded compared to what is specified in 3GPP TS 33.203 v2.0.0.

It is important to understand that the signaling indicated in FIGS. 5A and 5B is meant to happen before any signaling involving the TE (such as the signaling indicated in FIGS. 2B and 2C).

It should also be understood that the $UA_{MT}$ of the MT 11b' is involved only in the authentication mechanism provided by the invention, not also in the signaling illustrated in FIGS. 2A–C, i.e. not also in connection with making extensions to SIP messages (or other kinds of messages having SDP components).

Scope of the Invention

It is to be understood that the above-described arrangements are only illustrative of the application of the principles of the present invention. In particular, in respect to the different messages named in the application, such as the INVITE message, although such messages are set out (sometimes only tentatively) in one or another standard or RFC, the invention is not intended to be in any way limited to any particular format or content of the messages indicated in the application; in mentioning a particular message, such as the INVITE message, what is important in respect to the invention is only the information communicated in the message essential to the operation of the invention. Thus, for example, an INVITE message can be interpreted more broadly as an "invitation" message, i.e. a message sent by a calling party to another party asking the other party if it will participate in a communication session with the calling party. Also, nothing about the invention limits its use to communication systems in which SIP signaling is used; it is of use in any communication systems in which signaling is used according to a protocol providing at least one message including a SDP component, and so besides SIP signaling, the signaling could be RTSP (real time streaming protocol) signaling, which also includes an SDP component. In addition, numerous modifications and alternative arrangements of what is disclosed here may be devised by those skilled in the art without departing from the scope of the present invention, and the appended claims are intended to cover such modifications and arrangements.

What is claimed is:

1. A user equipment (UE) device (11) including a mobile terminal (MT) (11b 11b') coupled to a terminal equipment (TE) device (11a), for use in multimedia communication requests for internet protocol (IP) communications across a packet switched communication network (12) where the multimedia communication requests are made using signaling according to a predetermined protocol, the TE (11b) including a user agent ($UA_{TE}$) for providing a communication establishment message (INVITE) as part of the signaling and including a session description protocol (SDP) component, the UE device (11) characterized by:

a) an IMS proxy adjunct (P+), located in the TE device (11a), responsive to the communication establishment message (INVITE) and other messages including the SDP component, for making extensions to the communication establishment message (INVITE) and other messages by extending the SDP component so as to reserve resources ensuring a predetermined quality of service (QoS) for the IP communications, and for originating and terminating messages according to the predetermined protocol on behalf of the user agent ($UA_{TE}$) in the TE device (11a) so that the packet switched communication network (12) need not take into account the operation of the IMS proxy adjunct (P+); and b) an IP router and QoS manager (Q), located in the MT (11b 11b'), responsive to control signals provided by the IMS proxy adjunct (P+), for providing QoS using access network specific procedures to open QoS enabled IP flows, and routing IP packets to different QoS enabled IP flows.

2. A UE device (11) as in claim 1, further characterized in that the IMS proxy adjunct (P+) configures the local media used between MT and TE according to a required QoS level.

3. A UE device (11) as in claim 1, further characterized in that the IMS proxy adjunct (P+) extends the signaling, in addition to by adding extensions to the communication establishment message (INVITE) and other messages, by also modifying headers, extending the SDP component, originating requests and providing responses on behalf of the terminal equipment (TE) device (11a) for any IMS required functionality.

4. A UE device (11) as in claim 1, further characterized in that the MT (11b=) also includes an IMS proxy (P), responsive to the communication establishment message with the extended SDP (INVITE with extended SDP), for providing a finalized communication establishment message with the extended SDP (INVITE with extended SDP) to the packet switched communication network (12) via a radio access network (12a), and for managing the QoS of the packet switched communication network (12) for multimedia communication data flows.

5. A UE device (11) as in claim 4, further characterized in that the IMS proxy adjunct (P+) is further responsive to messages used in a communication establishment sequence provided by the packet switched communication network (12) via the IMS proxy (P) or provided directly from the packet switched communication network (12), for removing extensions from the SDP and providing the communication establishment messages without any extensions.

6. A UE device (11) as in claim 4, wherein the predetermined protocol is session initiation protocol (SIP) and further wherein the MT (11b') is operative according to a procedure for registering with an Internet Protocol (IP) Multimedia Subsystem (IMS) server (12c) so as to allow the MT (11b') to access, over a digital communication system, an IP multimedia service to which the MT (11b') is subscribed, the procedure including having the MT (11b') send an SIP register message to a proxy call session control function (P-CSCF), the UE device (11) characterized in that the SIP register message sent according to the procedure includes a field conveying information indicating whether the MT (11b') includes IMS proxy functionality.

7. A UE device (11) as in claim 6, further characterized in that in a registration coming from the TE (11a), the IMS proxy (P) in the MT (11b') adds a field conveying addressing information so that the IMS server (12c) is able to route subsequent SIP signaling through the IMS proxy (P).

8. A method for use by user equipment (UE) device (11) including a mobile terminal (MT) (11b 11b') coupled to a terminal equipment (TE) device (11a), the method for use in multimedia communication requests for internet protocol (IP) communications across a packet switched communication network (12) where the multimedia communication requests are made using signaling according to a predetermined protocol, the TE (11b) including a user agent ($UA_{TE}$) for providing a communication establishment message (INVITE) as part of the signaling and including a session description protocol (SDP) component, the method characterized by:

a) having an IMS proxy adjunct (P+), located in the TE device (11a), respond to the communication establishment message (INVITE) and other messages including the SDP component by making extensions to the communication establishment message (INVITE) and other messages by extending the SDP component so as to reserve resources ensuring a predetermined quality of service (QoS) for the IP communications, and by originating and terminating messages according to the predetermined protocol on behalf of the user agent ($UA_{TE}$) in the TE device (11a) so that the packet switched communication network (12) need not take into account the operation of the IMS proxy adjunct (P+); and b) having an IP router and QoS manager (Q), located in the MT (11b 11b'), respond to control signals provided by the TMS proxy adjunct (P+) by providing QoS using access network specific procedures to open QoS enabled IP flows, and routing TP packets to different QoS enabled IP flows.

9. A method as in claim 8, further characterized by having the IMS proxy adjunct (P+) configure the local media used between MT and TE according to a required QoS level.

10. A method as in claim 8, further characterized by having the IMS proxy adjunct (P+) extend the signaling, in addition to by adding extensions to the communication establishment message (INVITE) and other messages, by also modifying headers, extending the SDP component, originating requests and providing responses on behalf of the terminal equipment (TE) device (11a) for any IMS required functionality.

11. A method as in claim 8, further characterized by having an IMS proxy (P) included in the MT (11b') respond to the communication establishment message with the extended SDP (INVITE with extended SDP) by providing a finalized communication establishment message with the extended SDP (INVITE with extended SDP) to the packet switched communication network (12) via a radio access network (12a), and also further characterized by having the IMS proxy (P) manage the QoS of the packet switched communication network (12) for multimedia communication data flows.

12. A method as in claim 11, further characterized by having the IMS proxy adjunct (P+) also respond to messages used in a communication establishment sequence provided by the packet switched communication network (12) via the IMS proxy (P) or provided directly from the packet switched communication network (12) by removing extensions from the SDP and providing the communication establishment messages without any extensions.

13. A method as in claim 11, wherein the predetermined protocol is session initiation protocol (SIP) and further wherein the MT (11b') is operative according to a procedure for registering with an Internet Protocol (IP) Multimedia Subsystem (IMS) server (12c) so as to allow the MT (11b') to access, over a digital communication system, an IP multimedia service to which the MT (11b') is subscribed, the procedure including having the MT (11b') send an SIP register message to a proxy call session control function (P-CSCF), the method characterized in that the SIP register message sent according to the procedure includes a field conveying information indicating whether the MT (11b') includes IMS proxy functionality.

14. A method as in claim 13, further characterized in that in a registration coming from the TE (11a), the IMS proxy (P) in the MT (11b') adds a field conveying addressing information so that the IMS server (12c) is able to route subsequent SIP signaling through the IMS proxy (P).

* * * * *

UNITED STATES PATENT AND TRADEMARK OFFICE
CERTIFICATE OF CORRECTION

PATENT NO. : 6,788,676 B2
DATED : September 7, 2004
INVENTOR(S) : Tiina Partanen et al.

It is certified that error appears in the above-identified patent and that said Letters Patent is hereby corrected as shown below:

Title page,
Item [75], Inventor, delete "Tinna" and substitue -- Tiina --.

Column 13,
Line 57, delete "(11b=)" and substitute -- (11b') --.

Column 14,
Line 53, delete "TMS" and substitute -- IMS --.
Line 55, delete "TP" and substitute -- IP --.

Signed and Sealed this

Thirty-first Day of May, 2005

JON W. DUDAS
*Director of the United States Patent and Trademark Office*